(12) United States Patent
Agarwal et al.

(10) Patent No.: US 7,756,747 B2
(45) Date of Patent: *Jul. 13, 2010

(54) RFID BUSINESS PROCESS-DECOUPLING OF DESIGN AND DEPLOYMENT TIME ACTIVITIES

(75) Inventors: Abhishek Agarwal, Andhra Pradesh (IN); Anil K. Prasad, Hyderabad (IN); Anush Kumar, Seattle, WA (US); Arunkumar Chacko, Kerala (IN); Balasubramanian Sriram, Sammamish, WA (US); Janaki Ram Goteti, Hyderabad (IN); Jayaram Kalyana Sundaram, Gachibowli (IN); Krishnan Gopalan, Hyderabad (IN); Pamela J. Scott, Bellevue, WA (US); Ramachandran Venkatesh, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 490 days.

This patent is subject to a terminal disclaimer.

(21) Appl. No.: 11/373,348

(22) Filed: Mar. 10, 2006

(65) Prior Publication Data
US 2007/0213994 A1    Sep. 13, 2007

(51) Int. Cl.
G06Q 20/00    (2006.01)
G06Q 30/00    (2006.01)
G06Q 10/00    (2006.01)

(52) U.S. Cl. .................. 705/23; 705/16; 705/1
(58) Field of Classification Search ............ 705/28
See application file for complete search history.

(56) References Cited

U.S. PATENT DOCUMENTS

| 5,650,768 | A  | 7/1997  | Eswaran |
| 5,910,776 | A  | 6/1999  | Black |
| 6,405,261 | B1 | 6/2002  | Gaucher |
| 6,631,363 | B1 | 10/2003 | Brown et al. |
| 6,677,852 | B1 | 1/2004  | Landt |
| 6,732,923 | B2 | 5/2004  | Otto |
| 6,784,802 | B1 | 8/2004  | Stanescu |

(Continued)

FOREIGN PATENT DOCUMENTS

EP    11632893    3/2006

(Continued)

OTHER PUBLICATIONS

PPWG. Peer-to-Peer Working Group, Glossary for Peer-to-Peer.10 pages downloaded from http://cs.ttu.ee/uursused/itv0040/glossary.html on Oct. 1, 2008.*

(Continued)

*Primary Examiner*—F. Zeender
*Assistant Examiner*—Paul Danneman
(74) *Attorney, Agent, or Firm*—Turocy & Watson, LLP

(57) ABSTRACT

The claimed subject matter provides a system and/or a method that facilitates implementing a binding between a radio frequency identification (RFID) process and a device. An RFID process can receive a tag read event from a device and make the tag read event available for at least one high level application. A binding engine can bind the RFID process to the device while decoupling a design time activity and a deployment time activity associated with the RFID process. In addition, the binding engine can include at least one of a device mapping component that employs a device binding; and a component configuration module that employs a component binding.

21 Claims, 14 Drawing Sheets

U.S. PATENT DOCUMENTS

| | | | |
|---|---|---|---|
| 6,862,735 B1 * | 3/2005 | Slaughter et al. | ............ 719/315 |
| 6,908,034 B2 | 6/2005 | Alleshouse | |
| 6,943,683 B2 | 9/2005 | Perret | |
| 7,155,305 B2 | 12/2006 | Hayes et al. | |
| 7,204,409 B2 | 4/2007 | Kumar et al. | |
| 7,267,275 B2 | 9/2007 | Cox et al. | |
| 2002/0059471 A1 | 5/2002 | Sanghvi et al. | |
| 2002/0070865 A1 | 6/2002 | Lancos et al. | |
| 2002/0170952 A1 | 11/2002 | Alsafadi et al. | |
| 2003/0135576 A1 | 7/2003 | Bodin | |
| 2003/0144926 A1 | 7/2003 | Bodin et al. | |
| 2003/0225928 A1 | 12/2003 | Paul | |
| 2003/0227392 A1 | 12/2003 | Ebert et al. | |
| 2004/0046642 A1 | 3/2004 | Becker et al. | |
| 2004/0070491 A1 | 4/2004 | Huang et al. | |
| 2004/0111335 A1 | 6/2004 | Black et al. | |
| 2004/0193641 A1 | 9/2004 | Lin | |
| 2004/0215667 A1 | 10/2004 | Taylor et al. | |
| 2005/0062603 A1 | 3/2005 | Fuerst et al. | |
| 2005/0092825 A1 | 5/2005 | Cox et al. | |
| 2005/0150952 A1 | 7/2005 | Chung | |
| 2005/0150953 A1 | 7/2005 | Alleshouse | |
| 2005/0237194 A1 | 10/2005 | VoBa | |
| 2006/0047789 A1 | 3/2006 | Kumar et al. | |

FOREIGN PATENT DOCUMENTS

| | | |
|---|---|---|
| WO | WO 03/102845 | 7/2003 |
| WO | 03102845 | 12/2003 |
| WO | WO 2005078633 | 8/2005 |

OTHER PUBLICATIONS

Sun, Writing Device Drivers, May 2002, 454 pages by Sun Microsystems, Inc. Downloaded from http://docs.sun.com/app/docs/doc/806-5222/kernelovr-77198?a=view. Downloaded Mar. 5, 2009.*

U.S. Appl. No. 11/025,702, filed Feb. 18, 2005, Kumar, et al.
U.S. Appl. No. 11/061,337, filed Mar. 1, 2005, Kumar, et al.
U.S. Appl. No. 11/069,459, filed Feb. 18, 2005, Kumar, et al.
U.S. Appl. No. 11/061,356, filed May 31, 2005, Kumar, et al.
U.S. Appl. No. 11/141,619, filed May 31, 2005, Kumar, et al.
U.S. Appl. No. 11/140,726, filed May 31, 2005, Kumar, et al.
U.S. Appl. No. 11/141,533, filed May 31, 2005, Agarwal, et al.
European Search Report dated Oct. 2, 2006, mailed Feb. 10, 2006 for European Patent Application Seial No. 05107796, 6 pages.
Tsetsos, et al. "Commerical Wirelss Sensor Networks: Technical and Business issues" Proceedings of the Second Annual Conference on Wireless On-Demand Network Systems and Services (Jan. 19-21, 2005) 8 pages.
Branch, et al. "Sentire: A Framework for Building Middleware for Sensor and Actuator Networks" Proceedings of the Third International Conference on Pervasive Computing and Communications Workshops Mar. 8, 2005) pp. 396-400.
Harrison, et al. "Information Management in the Product Lifecycle—the Role Networked RFID" Proceedings of the Second IEE International Conference (Jun. 24, 2004) pp. 507-512.
Bornhovd, et al. "Integrating Smart Items with Business Processes An Experience Report" Proceedings of the Thirt-Eighth Hawaii International Conference on System Science (Jan. 3, 2005) 8 pages.
Ganesh, et al. "Web Services and Multi-Channel Integration: A Proposed Framework" Proceedings of the IEEE International Conference on Web Services (Jul. 6, 2004) 8 pages.
European Search Report dated Feb. 6, 2006, mailed Feb. 6, 2006 for European Patent Application Seial No. 05107826, 7 pages.
Ortiz, "An Introduction to Java Card Technology—Part 1" http://developers.sun.com/techtopics/mobility/javacard/articles/javacard1/> last viewed Dec. 19, 2005, 14 pages.
Chen. "Understanding Java Card 2.0" URL:.com//javaworld/jw-03-1998/jw-03-javadev_p.html> last viewed Dec. 19, 2005, 12 pages.
IBM "alphaWorks: RFID Device Development Kit: Overview" http://www/alphaworks.ibm.com/tech/rfiddevice last viewed Nov. 7, 2005, 1 page.
Alien "ALR-9800 Enterprise RFID Reader" http://www.alientechnology.com/docs/AT_DS_9800_v3_WEB.pdf last viewed Nov. 17, 2005, 4 pages.
Eurpoean Search Report dated Feb. 7, 2006; mailed Feb. 7, 2006 for PCT Application Serial No. EP 05 10 8001; 7 pages.
European Search Report dated Oct. 4, 2006 and mailed Apr. 11, 2006 for EP 05108005, 9 pages.
European Search Report dated Mar. 9, 2006 mailed Mar. 22, 2006 for European Patent Application Serial No. EP05107794, 7 Pages.
Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.
European Search Report dated May 11, 2006, mailed May 12, 2006 for European Patent Application Serial No. EP05107744, 9 pages.
European Search Report dated Mar. 9, 2006, mailed Mar. 27, 2006 for European Patent Application Serial No. EP05107744, 7 pages.
Floerkemier, et al. "PML Core Specification 1.0" Sep. 13, 2003, Auto-ID Center, Version 1.0, 48 pages.
International Search Report dated and mailed Jul. 27, 2007 for PCT Application Serial No. PCT 2007/004005, 6 pages.

* cited by examiner

RFID BUSINESS PROCESS-DECOUPLING OF DESIGN AND DEPLOYMENT TIME ACTIVITIES

BACKGROUND

Many retail, manufacturing, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

Automatic identification and data capture (AIDC) technology, and specifically, Radio Frequency Identification (RFID) has been developed based at least upon the need to cure deficiencies of typical monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and an RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between about 125 to 134 kilohertz), high frequency tags (about 13.56 megahertz), UHF tags (about 868 to 956 megahertz) and Microwave tags (about 2.45 gigahertz).

In general, an RFID system can include multiple components: tags, tag readers (e.g., tag transceivers), tag writers, tag-programming stations, circulation readers, sorting equipment, tag inventory wands, RFID printers, etc. Establishing an RFID system within a distribution and/or manufacturing environment can be an overwhelming and meticulous task. In particular, configuring various processes, applications, and/or instructions for such systems at a conceptual level can be complicated by the immense amount of devices, components, repetitive settings and/or properties respective to such devices and components, and/or any other particularities associated with a potential client's environment.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate binding at least one RFID process to a device and/or one or more devices. A binding engine can bind an RFID process to a device(s) to allow data collected by the device(s) to be utilized by the RFID process. It is to be appreciated that although the subject innovation is depicted to facilitate binding of at least one RFID process and a device, there can be any number of RFID processes and any number of devices such that the plurality of a word is to be interpreted as multiple instances of the singular word. Thus, the binding engine allows the decoupling of design time activities and deployment time activities associated with the RFID process and the device. The design time activity can be the process of conceptualizing an RFID business process by specifying logical device elements, specifying logical sources as containers for logical device elements, and/or creating a pipeline of components (e.g., event handlers). The deployment time activity can be the act of making an RFID business active (e.g., receive tags), by mapping logical entities to physical entities and configuring components (e.g., event handlers) to work correctly in the deployed environment. For instance, the RFID process can be created, generated, and/or executed within a physical device architecture without the RFID process being aware of the physical device configuration within such architecture. In other words, an RFID process can be designed independent of the physical device architecture. Therefore, the RFID process can be a generic process that can be marketed and/or deployed to various enterprises (e.g., where there can be a plurality of enterprises, each enterprise having a distinct and/or unique device configuration, layout, and/or physical architecture).

In accordance with one aspect of the claimed subject matter, the binding engine can include a device mapping component. The device mapping component can provide a device binding between the RFID process and the device and/or one or more devices. It is to be appreciated that the binding can be a technique of mapping external devices to internal logical devices, and assigning values to initialization parameters of components. The device mapping component can employ device binding which can be the action of linking a logical entity (e.g., logical device) with a physical entity. Moreover, the binding engine can further include a component configuration module that can provide any suitable mapping from an event handler to the RFID process. The component configuration module can employ component binding which can be referred to as the specification of values for initialization parameters of components such as, but not limited to, internal logical elements.

In accordance with another aspect of the claimed subject matter, the binding engine can further utilize a binding component that can create a binding object that facilitates binding the RFID process to the device and/or more device. The binding component can provide seamless binding between the RFID process and the device(s) (e.g., device binding) and/or an event handler and the RFID process (e.g., component binding). Furthermore, the binding engine can further utilize a process update component that can allow dynamic updates to the RFID process in relation to binding changes without any interruption of the RFID process.

In accordance with another aspect of the claimed subject matter, the process of binding can allow Authors (e.g., Independent Software Vendors (ISV)) to supply a process definition and a set of associated component files to customers. This can creates a market for RFID business processes and respective vendors. Moreover, an RFID business process can in theory be "sealed", thereby preventing customers from willfully changing the implementation. This can allows ISV's to be guaranteed that their implementation runs as specified in the customer premises. Customers are free to ask the ISV's for changes to the algorithms implemented by the components published by the ISVs'.

In accordance with yet another aspect of the subject innovation, the RFID business process can be packaged. Due to the binding architecture, one can package an entire RFID business process and enable shipment of such a process from software vendor to customer. This package can contain the process definition, the bindings and the actual binaries that implement the components. This "deployment" package would significantly cut down the complexity and the time it requires to deploy a RFID business process. In other aspects of the claimed subject matter, methods are provided that facilitate binding at least one RFID process to at least one device.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
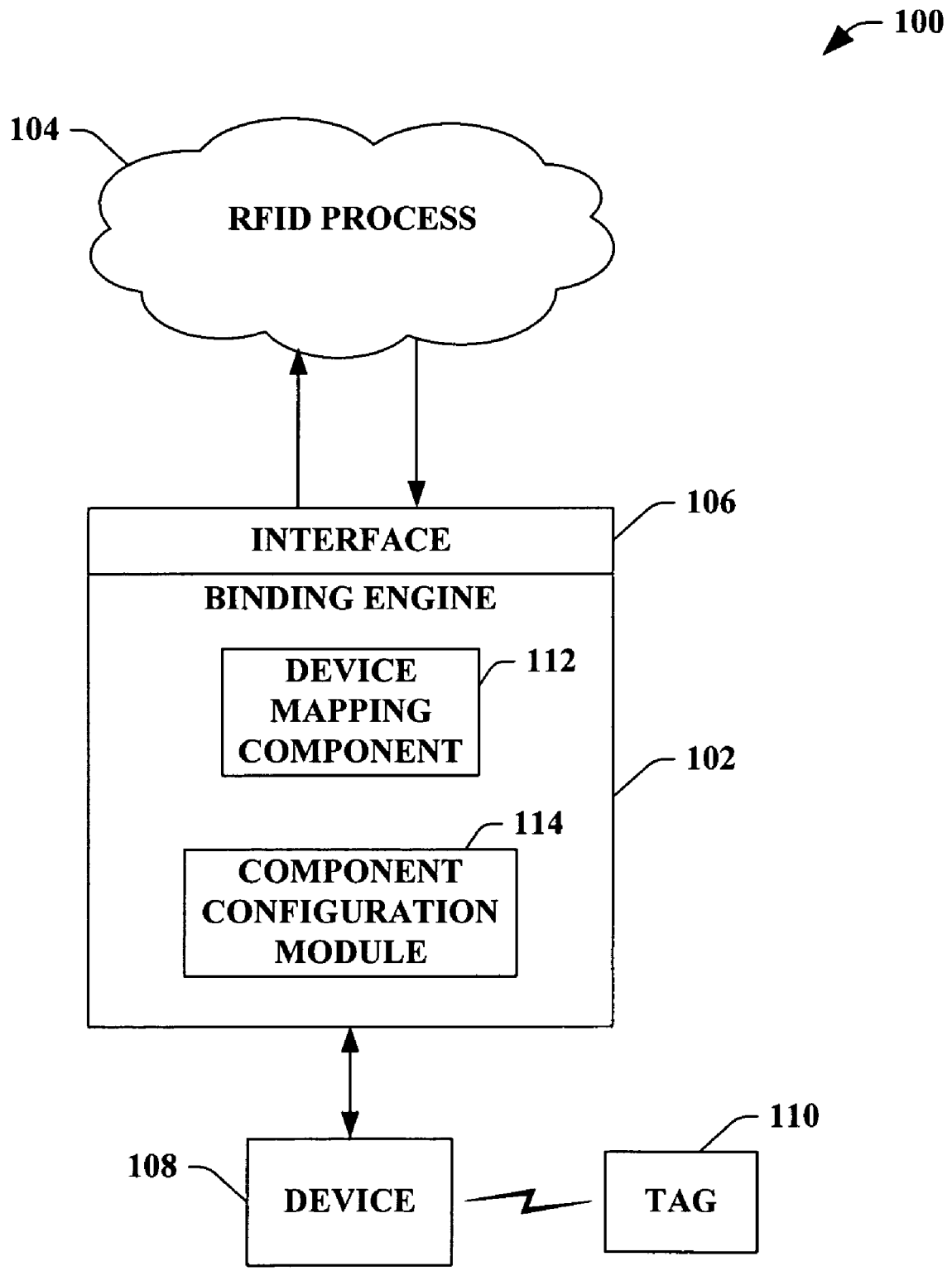
FIG. 1 illustrates a block diagram of an exemplary system that facilitates binding a process to a device and/or one or more devices while providing a decoupling of design time activities and deployment time activities.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "tag," "process," "engine," "module," "device," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates binding a process to one or more devices while providing a decoupling of design time activities and deployment time activities. The system 100 can include a binding engine 102 that can bind an RFID process 104 (also referred to as an RFID business process 104) to a device 102. It is to be appreciated that there can be any number of devices that bind to the RFID process 104. The binding provided by the binding engine 102 can invoke a separation of the RFID process 104 into a pure process definition and a pure binding definition. Thus, the binding engine 102 allows the decoupling of design time activities and deployment time activities. The design time activity can be the process of conceptualizing an RFID process 104 by specifying logical device elements, specifying logical sources as containers for logical device elements, and/or creating a pipeline of components (e.g., event handlers). The deployment time activity can be the act of making an RFID process 104 active (e.g., receive tags), by mapping logical entities to physical entities and configuring components (e.g., event handlers) to work correctly in the deployed environment. Such decoupling can allow the RFID process 104 to be designed independently of the physical device architecture. The RFID process 104 can be a generic process that can be marketed and/or deployed to various enterprises (e.g., where there can be a plurality of enterprises, each enterprise having a distinct and/or unique device configuration, layout, and/or physical architecture). Process of binding takes a process definition and associates devices and/or components to the actual topology and systems configuration that is in an enterprise (e.g., an environment to which the RFID process 104 is to be initiated).

It is to be appreciated that the device 108 can receive a signal from, for instance, at least one tag 110 and/or a plurality of tags. In one example, the tag 110 can contain an antenna that provides reception and/or transmission to radio frequency queries from the device 108. Furthermore, it is to be appreciated that the device 108 can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Additionally, although a single device 108 and tag 110 are depicted, it is to be appreciated that a plurality of devices 108 and tags 110 can be utilized with the system 100.

In particular, the binding engine 102 can include a device mapping component 112 that can provide any suitable mapping from a physical device (e.g., device 108) to the RFID process 104. In other words, the device mapping component 112 can provide a device binding between the RFID process 104 and the device 108. It is to be appreciated that for the remainder of the subject innovation a binding can be referred to as a process of mapping external devices to internal logical devices, and assigning values to initialization parameters of components. The device mapping component 112 can employ device binding which can be the action of linking a logical entity (e.g., logical device) with a physical entity. In device binding, a logical device is bound to a device or a device group, wherein the device group can be a collection of devices that have substantially similar characteristics or perform similar functions and are grouped to deal with devices efficiently.

The binding engine can further include a component configuration module 114 that can provide any suitable mapping from an event handler to the RFID process 104. The component configuration module 114 can employ component binding which can be referred to as the specification of values for initialization parameters of components such as, but not limited to, internal logical elements. For example, the component binding can be to a component that can be defined such as, but not limited to, an event handler. An event handler can be managed code running in the context of the RFID process 104 that processes a tag event.

It is to be appreciated that the RFID process 104 can utilize any suitable number of devices 108. An RFID process 104 can be related to a particular RFID sub-system (e.g., an RFID server, RFID network, etc.) that is an uber or high-level object that forms together various entities to create a meaningful unit of execution. The RFID process 104 can be and/or can include an outbound process (e.g., pick, pack, shipping scenario, etc.), a manufacturing process, a shipping process, a receiving process, tracking, data representation, data manipulation, data application, security, . . . . Additionally, the RFID process 104 can include and/or respond to a device service, a tag read, an event, a tag write, a device configuration, a geographic tracking, a number count, etc. It is to be appreciated that the RFID process 104 can have raw data collected via at least one device, wherein such raw data can be manipulated based at least in part upon a rule and/or a business rule engine (not shown). The RFID process 104 can take a tag read event from the device 108 and make the tag read event available for at least one high level application.

For instance, the RFID process 104 can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the RFID process 104 can write to a tag process, wherein a tag can be written in real-time based at least upon an input. The write process can also check if the write succeeded by reading and passing data back to the host.

The binding engine 102 can allow the dynamic update of any binding created between the RFID process 104 and the device 108. For instance, a warehouse can deploy a first process that can be bound to a first collection of devices having a first device, a second device, and a third device. Similarly, the warehouse can deploy a second process that can be bound to a second collection of devices having the first device and the second device. The first and/or second process can be dynamically updated in respect to the bindings associated therewith without interrupting the running first and/or second process. Thus, the second process can be bound to the third device without the interrupting the execution of the second process. For example, the above example can be implemented by utilizing a user interface (UI) (discussed in more detail infra).

In addition, the process of binding can allow Authors (e.g., Independent Software Vendors (ISV)) to supply a process definition and a set of associated component files to customers. This can creates a market for RFID business processes and respective vendors. Moreover, an RFID business process can in theory be "sealed", thereby preventing customers from willfully changing the implementation. This can allows ISV's to be guaranteed that their implementation runs as specified in the customer premises. Customers are free to ask the ISV's for changes to the algorithms implemented by the components published by the ISVs'. Moreover, the RFID business process can be packaged by the ISV. Due to the binding architecture, one can package an entire RFID business process and enable shipment of such a process from software vendor to customer. This package can contain the process definition, the bindings and the actual binaries that implement the components. This "deployment" package would significantly cut down the complexity and the time it requires to deploy a RFID business process.

Moreover, the system 100 can include any suitable and/or necessary interface component 106 (herein referred to as "interface 106"), which provides various adapters, connectors, channels, communication paths, etc. to integrate the binding engine 102 into virtually any operating and/or database system(s). In addition, the interface 106 can provide various adapters, connectors, channels, communication paths, etc., that provide for interaction with the binding engine 102, the RFID process 104, the device 108, the tag 110, and any other device and/or component associated with the system 100.

Figure 2:
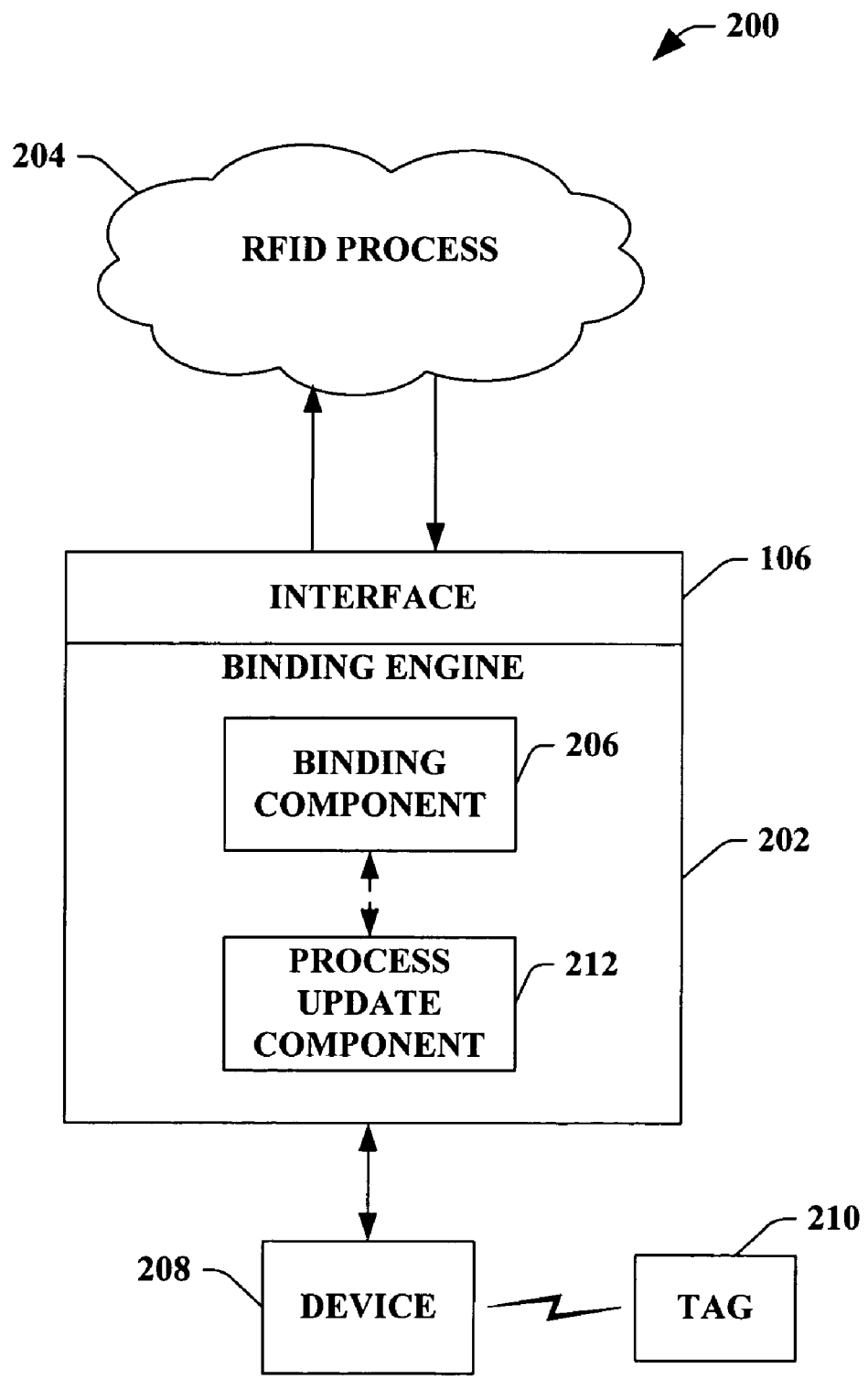
FIG. 2 illustrates a block diagram of an exemplary system that facilitates employing at least one of binding a process to a device and/or one or more devices and dynamically updating a binding.

FIG. 2 illustrates a system 200 that facilitates employing at least one of binding a process to one or more devices and dynamically updating a binding. The system 200 can include a binding engine 202 that can bind at least one RFID process 204 to at least one device 208 such that a decoupling of design time activities and deployment time activities can be employed. The binding engine 202 can provide a device binding (e.g., linking a logical entity and/or device with a physical entity) and/or a component binding (e.g., specifying values for initialization parameters of components such as internal logical elements). Thus, the binding engine 202 can separate the RFID process 204 into a pure process definition and a pure binding definition. Upon binding between the RFID process 204 and the device 208, data related to at least one tag 210 can be wirelessly communicated and utilized by the appropriate RFID process 204 accordingly. It is to be understood that the binding engine 202, the device 208, the tag 210, and the RFID process 204 can be substantially similar to the binding engine 102, the device 108, the tag 110, and the RFID process 104 depicted in FIG. 1.

The device 208 and the tag 210 can be associated with a physical RFID network (not shown), wherein the physical RFID network can be implemented by any enterprise, business, facility, and/or any suitable entity that can utilize RFID technology. For instance, the physical RFID network can be deployed to include any number of devices 208 such as device $_1$ to device $_N$, where N is positive integer. Moreover, such devices 208 can interact (e.g., wirelessly communicate) with any number of tags 210 such as tag $_1$ to tag $_M$, where M is a positive integer. In addition, the device 208 can be associated with at least an antenna to communicate data. Furthermore, it is to be appreciated that the tags 210 can be associated to any suitable object related to the enterprise, business, facility, and/or any suitable entity utilizing such RFID technology.

Moreover, although only a single RFID process 204 is depicted, it is to be appreciated that a plurality of RFID processes can be executed in conjunction with the device 208. For instance, the process can be a shipping process that is related to the devices at the shipping door, wherein the devices can collect data at such location. Similarly, another process can be a receiving process that is related to the devices at the receiving door, wherein the devices can collect data at such location.

Furthermore, the RFID process 204 can be a business process, wherein the devices 208 can be indirectly utilized in association with the business process. In an example, the RFID stack can bridge the gap between devices 208 and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time. In another example, an RFID host can utilize a business rules engine (not shown), wherein such business rules engine can provide a rule-based system in association with any application such that a filter and/or alert can be utilized as a rule(s). The business rules engine can execute declarative filters and/or alerts as rules, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

For instance, different vendors can have disparate processes associated thereto based at least in part upon the tag data received. As stated above, the binding engine 202 can bind a process to the device 208 and/or a group of devices (e.g., readers). Furthermore, a user can utilize a notification setting, wherein the security setting can be related to the notification to provide access to the process. In particular, if the process is bound to the device group X, that process can receive events from device group X. Yet, if the process does not contain notification data (e.g., credentials), such process may not be able to receive events from group X.

The system 200 can utilize a logical source that contains at least one or more logical devices and/or one or more components (e.g., event handlers). The logical devices and/or components can form a pipeline, wherein a multitude of pipelines can be put together to form an event processing tree. The logical source (LS) can have a LogicalSourceList and a LogicalDeviceList. Each LogicalDeviceList (LDList) can be made up of LogicalDevices (LDs) which can be bound to at least one of a DeviceGroupList, a DeviceList, and a RegexCollection (e.g., regular expression (Regex). The LogicalDevice (e.g., which can also have a name and/or disparate reference) can allow a component in a RFID process pipeline can have some business context for a physical device. For instance, an event handler can decide to do one event if the physical device 208 of the tag belongs to the "Shipping" LogicalDevice, and it can further do some other event if the physical device 208 belongs to the "Receiving" LogicalDevice. Accordingly, TagReadEvent.ServerTag.DeviceCollectionName can also be referred to TagReadEvent.ServerTag.LogicalDeviceName. In one scenario, the LS can directly have a DeviceGroupList, a DeviceList, and a Regex-Collection and not have the concept of a LogicalDevice.

The binding engine 202 can include a binding component 206 that can create a binding object to allow for seamless binding between the RFID process 204 and one or more devices 208 (e.g., device binding) and/or an event handler and the RFID process 204 (e.g., component binding). The binding object allows a deployer (e.g., user, administrator, etc.) to bind the RFID process 204 to an actual, physical device 208. By utilizing the binding component 206 to create and employ the binding object, various benefits are achieved. For example, a clear separation of a process definition (e.g., as shipped by an independent service vendor (ISV)) and the process deployer (e.g., who populates the binding object for that process). Moreover, the binding object aligns itself well with application level events (ALE), where an ALE spec (e.g., which can be unaware of the physical device(s) 208) can be mapped to the RFID process 204. Separating the RFID process 204 from the physical devices 208 can allow the ALE specification to be modified while remaining agnostic to the physical bindings created by the system 200.

The binding object can provide at least one initialization parameter for an event handler and/or a rule. For instance, the initialization parameter can be part of the process definition so that the process authors (e.g., an ISV, user, software manufacturer, etc.) can provide a default value. The value of the initialization parameter in the binding object can override values provided in the process definition. The components can be referred to utilizing a name in the binding object created. It is to be appreciated that the name can be unique within the process.

The following pseudo-code can be implemented by the binding component 206 to create the binding object. It is to be appreciated that the following is an example and the subject innovation is not so limited as a plurality of variations can be invoked. Moreover, it is to be understood that comments are proceeded with "//."

```
class LogicalDevice           //contained within an LS
{
    string Name;
    string Description;
}
class DeviceBinding
{
    string LogicalDeviceName;    //can be unique within a process
    //Binding of the logical device to physical entities:
    StringCollection DeviceGroupList;
    StringCollection DeviceList;
    RegexCollection RegexCollection;
}
class ComponentBinding
{
    string ComponentName;
    ParameterDataList parameterDataList;
}
class ProcessBinding
{
    string ProcessName;
    ArrayList<DeviceBinding> DeviceBindingList;
    ArrayList<ComponentBinding> ComponentBindingList;
}
```

The binding engine 202 can further include a process update component 212 that can dynamically update the RFID process 204 in relation to any manipulations, changes, and/or disparities associated with the binding established. The process update component 212 can provide a dynamic update to any binding associated with the system 200 such that there is no need stop and/or interrupt the RFID process 204. For example, the process update component 212 can update the RFID process 204 dynamically based on a name and/or reference. Thus, the process update component 212 can bind a disparate device to a particular process without interrupting the execution of the particular process. The following pseudo-code can be implemented by the process update component 212 to provide dynamic updates to the bindings and/or the RFID process 204. It is to be appreciated that the following is an example and the subject innovation is not so limited as a plurality of variations can be invoked. Moreover, it is to be understood that comments are proceeded with "//."

```
//Adds or updates a process binding based on process name
void SaveProcessBinding(ProcessBinding processBinding);
ProcessBinding GetProcessBinding(string processName);
void DeleteProcessBinding(string processName);
```

Figure 3:
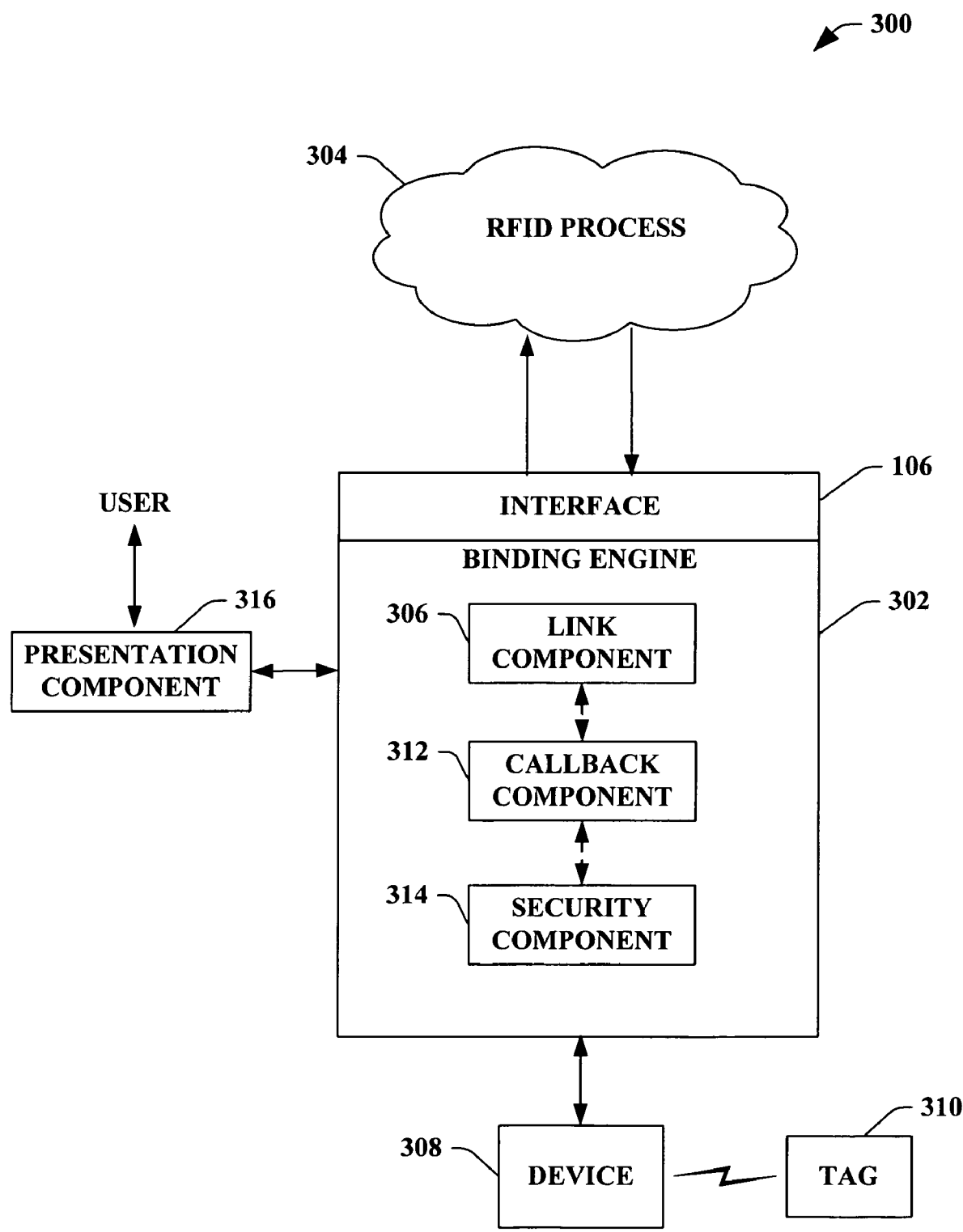
FIG. 3 illustrates a block diagram of an exemplary system that facilitates ensuring the integrity of a binding between a process and at least one device that can wirelessly communicate with a tag.

FIG. 3 illustrates a system 300 that facilitates ensuring the integrity of a binding between a process and one or more devices that can wirelessly communicate with a tag. The system 300 can include a binding engine 302 that can dynamically initiate a binding between an RFID process 304 and at least one device 308. The RFID process 304 can be bound to the device 308 in a manner such that the RFID process 304 can be separated into a pure process definition an a pure binding definition. In other words, the RFID process 304 can be created, generated, and/or executed within a physical device architecture without the RFID process 304 being aware of the physical device configuration within such architecture. The RFID process 304 can be a generic process that can be marketed and/or deployed to various enterprises (e.g., where there can be a plurality of enterprises, each enterprise having a distinct and/or unique device configuration, layout, and/or physical architecture). Moreover, the binding engine 302 can provide a device binding (e.g., linking a logical entity and/or device with a physical entity) and/or a component binding (e.g., specifying values for initialization parameters of components such as internal logical elements). It is to be appreciated that the binding engine 302, the RFID process 304, the device 308, a tag 310, and the interface 106 can be substantially similar to components, processes, devices, and/or tags described supra.

The system 300 can utilize a link component 306 that can facilitate manipulating a binding between at least one RFID process 304 and at least one device 308. It is to be appreciated that the system 300 can implement decoupling without the use of a hard link and/or a soft link, yet the following is an exemplary illustration of utilizing the link component 306 to maintain such linkage. The link component 306 can maintain the bindings within the system 300 by utilizing two kinds of binding relationships between the RFID process 304 and the device 308: a hard link and a soft link. Hard links can be explicit relationships between a process and a device or a process and a device group. A hard link is an explicit contract between the device administrator and the process administrator and may not be overridden by just the device administrator. If a hard link exists to a device, it may not be renamed, dropped, and/or deleted until the hard link is dropped and/or deleted. If a hard link exists to a device group, it cannot be renamed or dropped until the hard link is dropped and/or deleted. However, the group membership can be changed independently by the device administrator. A soft link can be an implicit link between a device and a process. The soft link can be established in two techniques: 1) by specifying a regular expression pattern; and 2) by changing the membership of a device group. On a soft link, the object model (OM) may not complain and/or invoke an error that an interested process is affected (e.g., a user interface can provide a warning to the device administrator about this particular scenario by querying the interested processes collection for the device). It is to be appreciated that all transient changes and/or manipulations (e.g., changing device properties, rebooting the device, rebooting the provider, etc.) may not be considered in this binding analysis. Moreover, it is to be appreciated that the process-binding can be changed while the process pipeline is online to minimize downtime and can be extremely beneficial to minimize any downtime associated with the system 300.

By allowing the link component 306 to employ a hard link and a soft link technique, various scenarios can be managed and/or handled. For instance, a process administrator can indicate an interest in a particular device by binding it explicitly by binding to the parent device group list or by biding to a regular expression that matches to the device name. After this step, deleting the device, changes to the device name or the device group that contains the device can affect whether the process gets events from a particular device or not. Thus, by utilizing the link component 306 and at least one hard link and one soft link, the above scenario can be handled.

As discussed above, the binding engine 302 can provide dynamic binding updates and/or manipulations without any interruption to the RFID process 304. In other words, process binding can be changed without stopping the RFID process 304. In one example, the dynamically updates related to bindings can be employed by instituting the following: 1) there may not be any dangling references to devices; 2) the object model (OM) may have limited authority to do things automatically (e.g., any changes that are made can be explicit); 3) minimize process downtime; 4) tool user should have to distinguish between a hard link and a soft link (e.g., or the distinguishing features should be minimum); and 5) deletion of device should be an easy technique.

The following is an example of to illustrate the above techniques and/or concepts. It is to be appreciated that the following is an example and the subject innovation is not so limited. Consider the RFID process 304 (P1) that binds to {d1, DockDoor*, DeviceGroup1 {containing d2}}. Deletion of device: consider the following four scenarios: 1) delete (d1)→Disallow (hard link); 2) delete (DeviceGroup1)→Disallow (hard link); 3) delete (DockDoor1)→Allow (soft link); and 4) delete (d2)→Allow (soft link). Moreover, a graphical user interface (GUI) (discussed infra) can be employed when a device is to be deleted. The GUI can call GetInterestedProcesses(deviceOrDeviceGroupName). The OM can return an array of [ProcessName, hard/soft link]. If more than one process is interested in the device, the GUI can throw up a warning dialog. If the user chooses to continue, the tool can either make the changes to the process binding (e.g., in case of a hard link) or just emits the DeleteDevice( ) call (e.g., in case of a soft link). It is to be further appreciated and understood that the renaming of the device 308 can be substantially similar to the above except the instruction "Delete( )" with "Rename( )."

The link component 306 can further maintain the interested process collection (IPC), wherein the IPC can be the list of currently running processes that either have a hard link or a soft link to a device. The IPC can be utilized for posting to a notification queue (not shown) (e.g., the hard links for a device group can be retrieved utilizing an application programmable interface (API)). A process can be part of the IPC for a device if, for example, the following condition is met: ((Hard-Link Exists||Soft-Link exists) && IsRunning) IDictionary<string, IDeviceManager2BindingEngine> GetInterestedProcess (string deviceName). This can return a list of running processes which currently have either a hard link or a soft link to the specified device. Note that this may not apply to device groups.

The binding engine 302 can utilize a callback component 312 that can implement various callbacks related to the RFID process 304. For example, callback component 312 can provide the RFID process 304 with an object called OnProcessEvents which can implement callbacks for at least one of the following: 1) OnProcessStartup( )—any initialization work for the process can be done here including holding onto the ContainerInterface; 2) OnProcessShutdown( )—any cleanup work can be done here; and 3) OnProcessError( )—any exception handling work can be done here. The following pseudo-code can be implemented by the callback component 312 to provide callbacks for the RFID process 304. It is to be appreciated that the following is an example and the subject innovation is not so limited as a plurality of variations can be invoked. Moreover, it is to be understood that comments are proceeded with "//."

```
Abstract class HandleProcessEvents
{
    Virtual void OnProcessStartup(ContainerInterface container);
        //ContainerInterface should probably be retired and replaced
        //with ProcessContext and ServerContext. Also,
        //ProcessContext and ServerContext have a static method
        //GetInstace (e.g., HttpContext), in which case we may not
        //need to pass anything to the method.
    Virtual void OnProcessShutdown(ContainerInterface container)
    Virtual void OnProcessError(ContainerInterface container);
}
```

The binding engine 302 can further utilize a security component 314 that can provide security techniques to protect and/or ensure the integrity of the system 300. In general, the security component 314 can implement security to the RFID process 304, the device 308, a binding relationship established between a process and a device, any combination thereof, etc. In particular, the security component 314 can define security, authorization, and/or privileges in accordance with the bindings associated with at least one RFID process 304 and at least one device 308, wherein at least a portion of the binding, process, device, and/or any combination thereof can be associated to a specific security level. It is to be appreciated that security component 314 can be a stand-alone component, incorporated into the binding engine 302, and/or any combination thereof. The security component 314 can further utilize an administrator account and password technique. For example, the administrator can set the account and password under which the ProcessEngine will run and the ProcessEngine is run with those credentials in a web hosting infrastructure (e.g., ASP.NET web hosting infrastructure). The username and password management can be delegated to an entity (e.g., ASP.NET) within the web hosting infrastructure.

The binding engine 302 can further utilize a presentation component 316 that provides various types of user interfaces to facilitate interaction between a user and any component coupled to the binding engine 302. As depicted, the presentation component 316 is a separate entity that can be utilized with the binding engine 302. However, it is to be appreciated that the presentation component 316 and/or similar view components can be incorporated into the binding engine 302 and/or a stand-alone unit. The presentation component 316 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the binding engine 302.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 4:
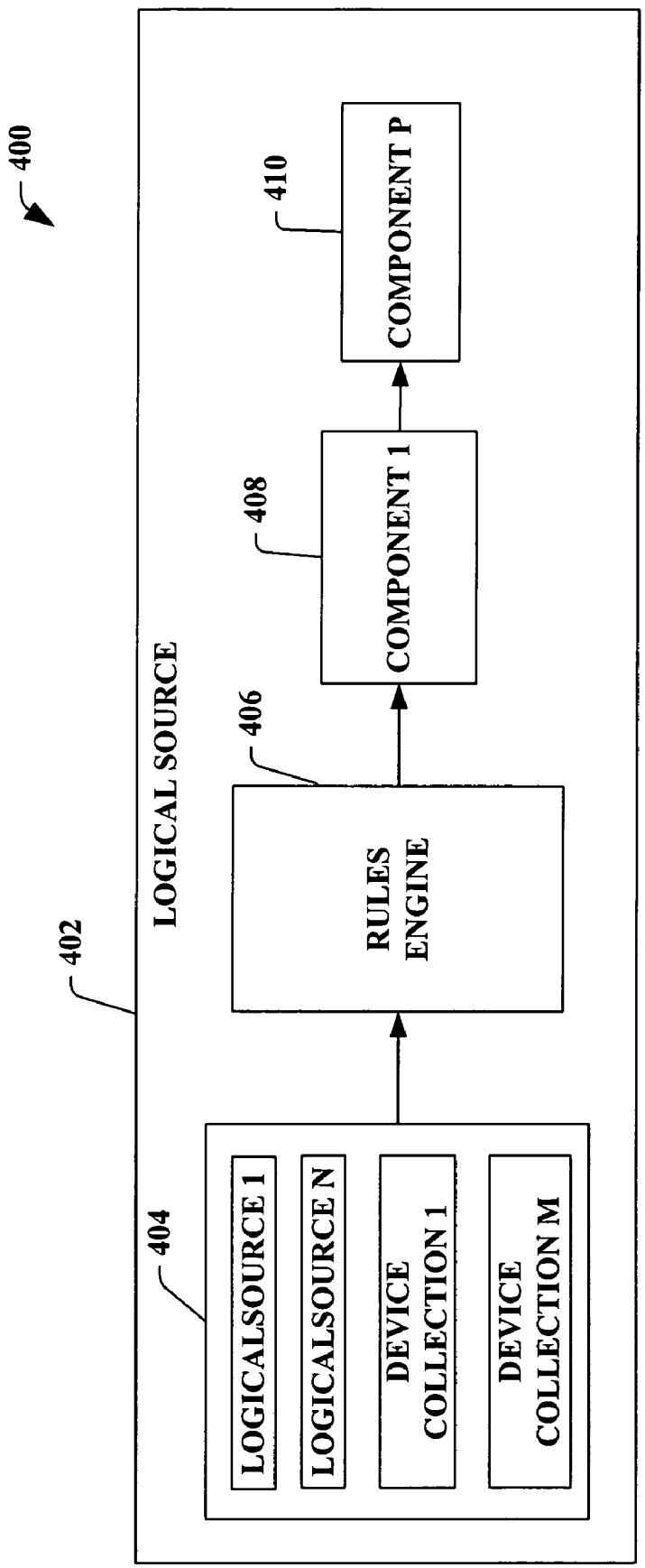
FIG. 4 illustrates a block diagram of a logical source in accordance with the subject innovation.

Turning briefly to FIG. 4, a diagram 400 of a logical source 402 is illustrated that can be utilized to create a model that is used to build an RFID application and/or process. In particular, a logical source 402 is a stream of tag reads and/or writes. The stream of reads can be processed and result in a different stream of reads. It is to be appreciated that the logical source 402 can recursively embed at least one other logical source. A group of events and/or tag reads 404 can be sent to a rules engine 406, where optional filters and/or alerts can be executed. The group of events and/or tag reads 404 can be N logical sources, where N is greater than or equal to one, and/or M device collections, where M is greater than or equal to one. After the rules engine 406, the group of events and/or tag reads 404 can be passed to a component 408. There can be N number of components 408, where N is greater than or equal to one. Moreover, the component 408 can be an event handler (not shown).

The event handler can manage an event from a logical source 402. The event handler can be utilized for at least one of the following: apply logic in real-time on tag read events and/or enrich the event in a specific manner; consume an event by a higher level application; write back to a tag when a blank tag read event is detected; etc. The event handler can specify actions when exceptions occur such as, but not limited to, a read error and a write error. It is to be understood that the exceptions can be from the logical source 402 during execution (e.g., managing a process specific event).

Figure 5:
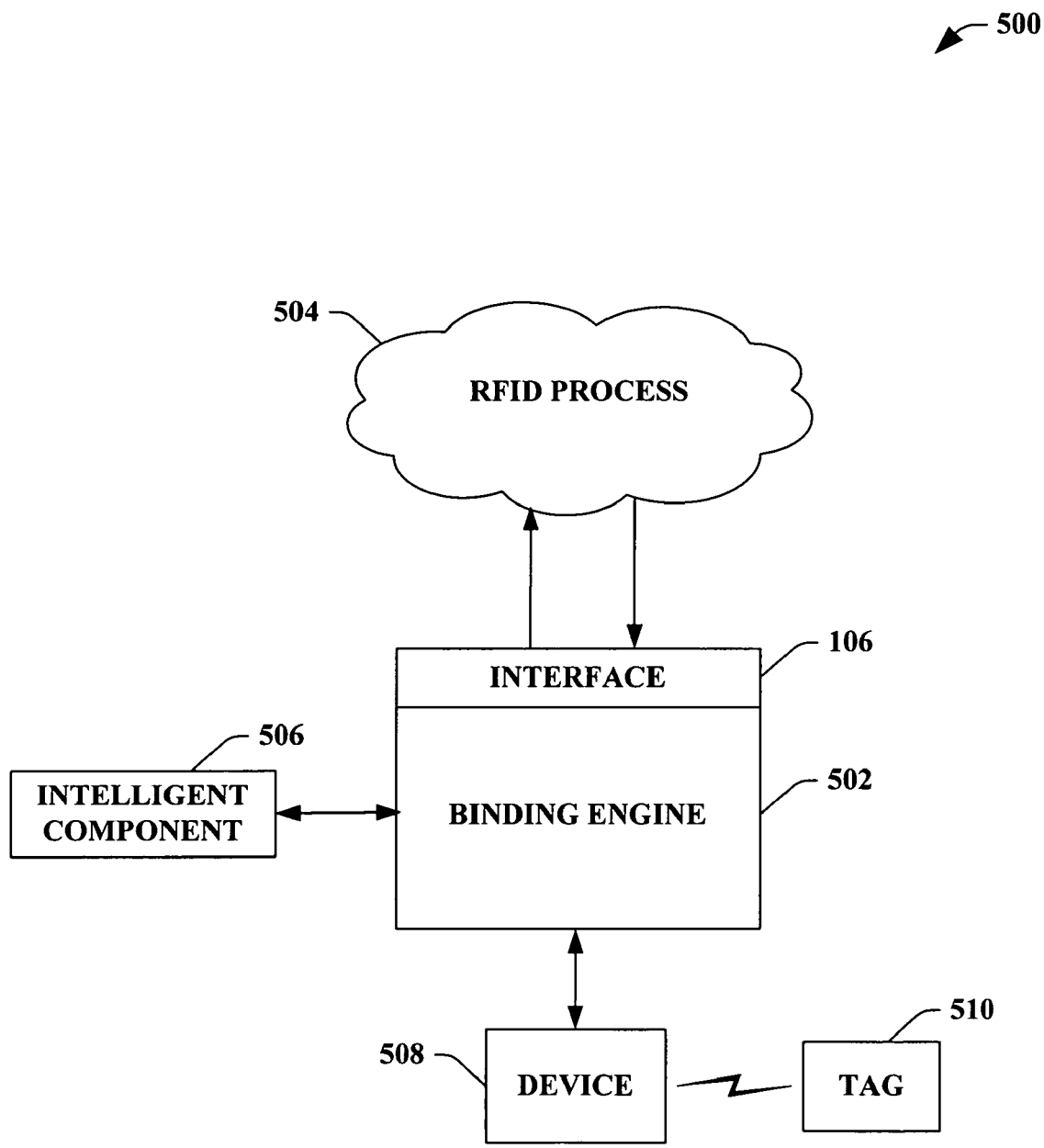
FIG. 5 illustrates a block diagram of an exemplary system that facilitates binding a process to one or more devices while providing a decoupling of design time activities and deployment time activities

FIG. 5 illustrates a system 500 that employs intelligence to facilitate binding a process to one or more devices while providing a decoupling of design time activities and deployment time activities. The system 600 can include a binding engine 502, an RFID process 504, a device 508, a tag 510, and the interface 106 that can all be substantially similar to respective engines, components, processes, tags, devices, and interfaces described in previous figures. The system 500 further includes an intelligent component 506. The intelligent component 506 can be utilized by the binding engine 502 to facilitate providing a device binding and/or a component binding in relation to the RFID process 504, the device 508, and an event handler. For example, the intelligent component 506 can infer the at least one of the following: security settings associated with a physical device architecture, process bindings, device bindings, component bindings, binding changes, process updates, optimized device groups, optimized device group settings and/or configurations, etc.

It is to be understood that the intelligent component 506 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 6:
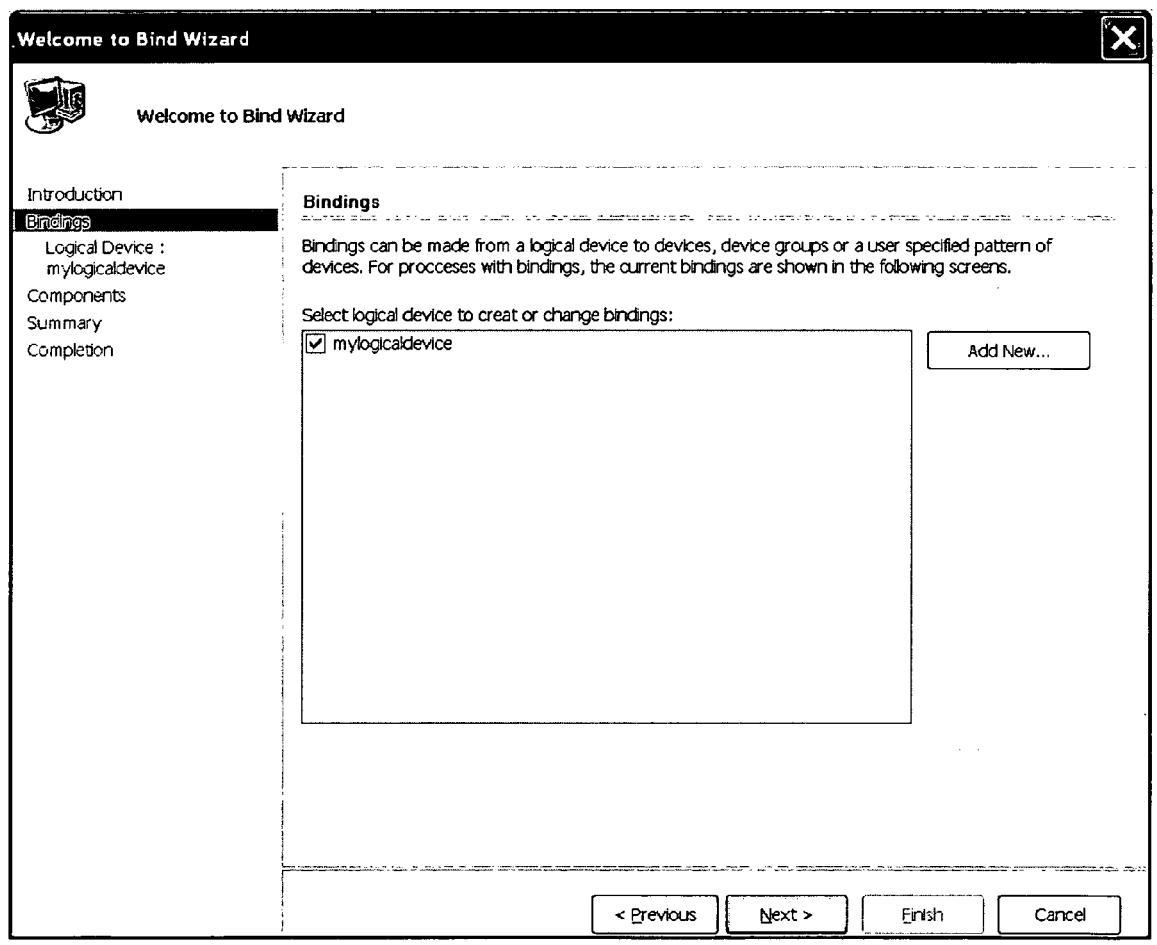
FIG. 6 illustrates a block diagram of an exemplary user interface in accordance with the claimed subject matter.
Figure 7:
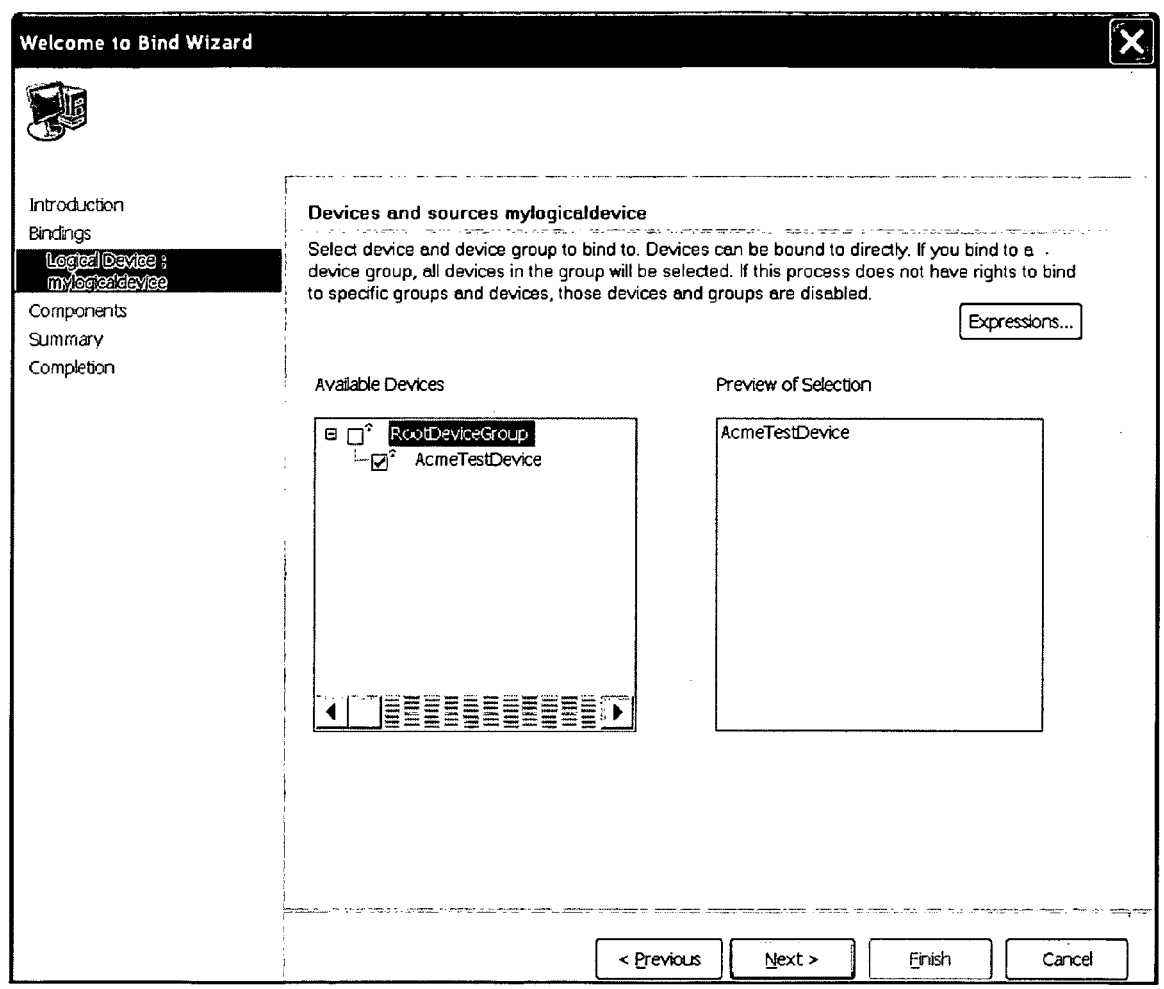
FIG. 7 illustrates a block diagram of an exemplary user interface in accordance with the claimed subject matter.
Figure 8:
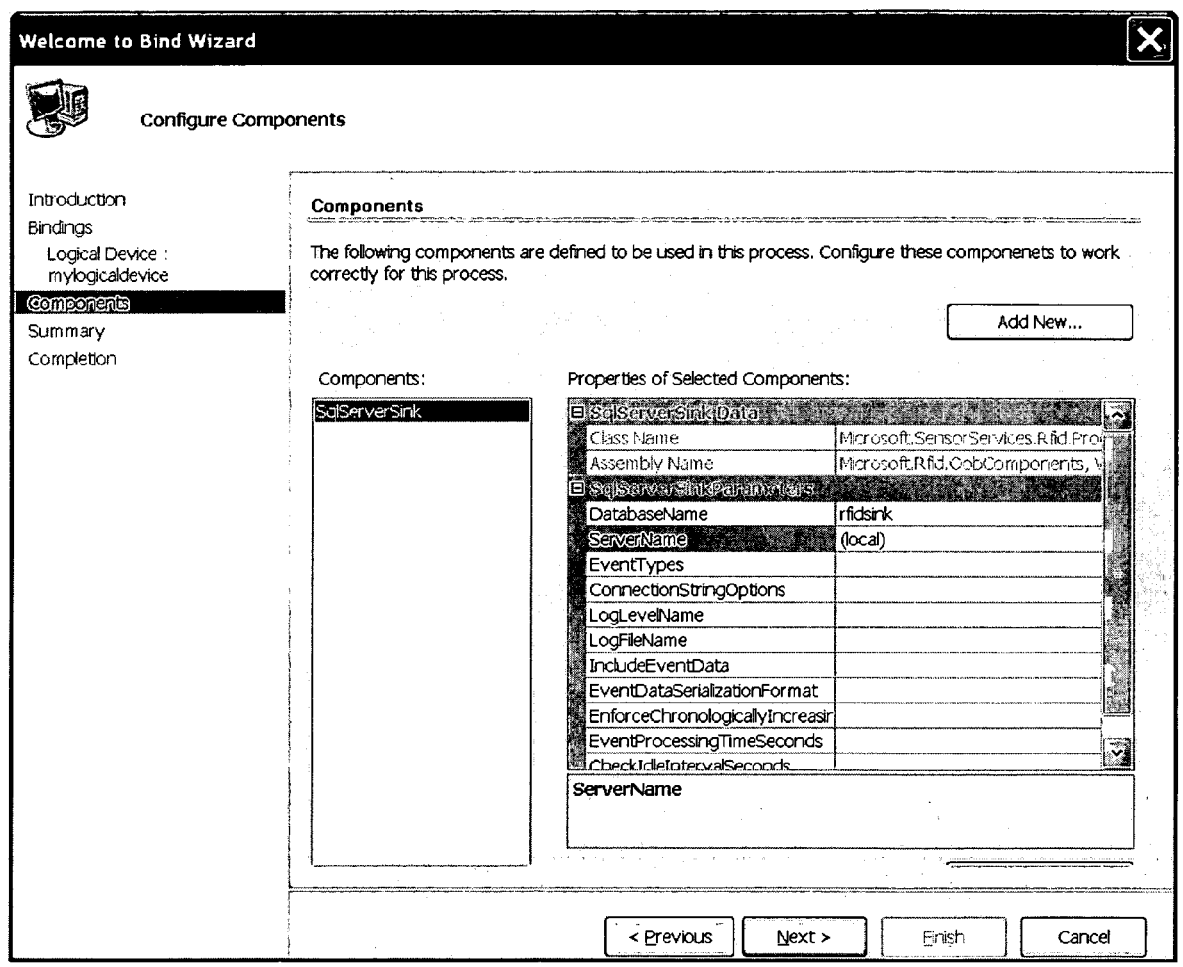
FIG. 8 illustrates a block diagram of an exemplary user interface in accordance with the claimed subject matter.

FIGS. 6-8 illustrate exemplary user interfaces in accordance with the claimed subject matter. It is to be appreciated that the user interfaces depicted are examples and the subject innovation is not to be so limited. In addition, it is to be appreciated that there are a plurality of nuances and/or subtleties that can be employed in connection with the user interfaces, thus any depiction is utilized to facilitate implementing the claimed subject matter.

FIG. 6 illustrates a user interface 600 that can provide a wizard application to facilitate providing a device binding and a component binding in connection with an RFID process and a device. The user interface 600 can display a list of logical devices in the RFID process. If there are no logical devices defined, the administrator can create one. For each logical device, the binding process can be repeated. FIG. 7 illustrates a user interface 700 that depicts the hierarchy of a device group and/or a device. The user interface 700 can differentiate a hard link and a soft link utilizing, for example, an icon. FIG. 8 illustrates a user interface 800 that can employ a component binding. The user interface 800 depicts an example of an out of the box SQL sink. The properties of the sink are displayed for the user to configure. It is to be appreciated that the user interface 800 can be utilized with any event handler that has at least one property.

Figure 9:
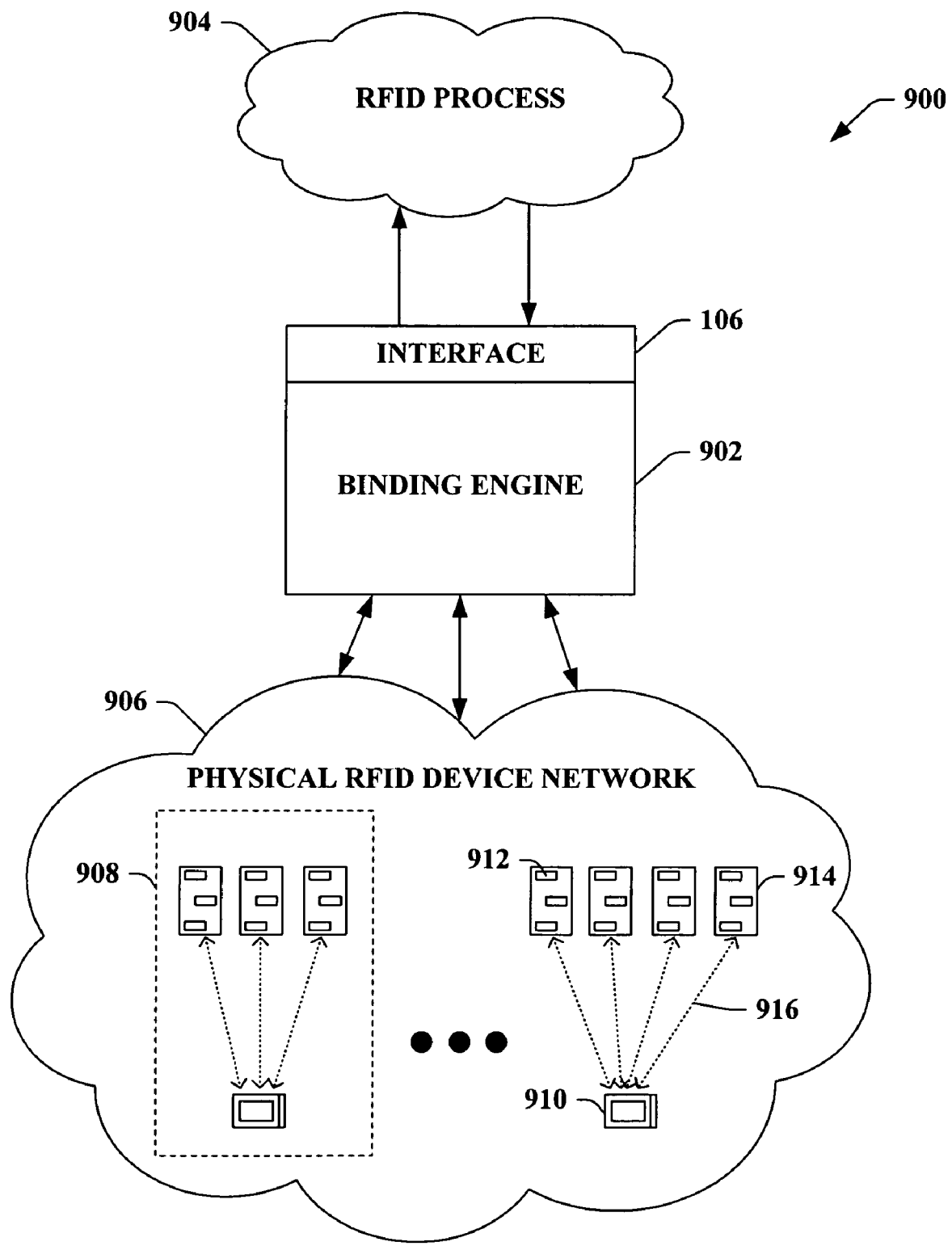
FIG. 9 illustrates a block diagram of an exemplary system that facilitates binding one or more RFID devices within a physical RFID network to a process.

FIG. 9 illustrates a system 900 that facilitates binding one or more RFID devices within a physical RFID network to a process. The system 900 can include binding engine 902 that provides a device binding and/or a component binding in relation to an RFID process 904 and a device 910, a device collection 908 (herein referred to as "first collection 908"), and/or any combination thereof within the physical RFID device network 906 (herein referred to as "RFID network 906"). The binding engine 902 can provide device binding and/or component binding within the RFID network 906 based at least in part upon a grouping, wherein the grouping of devices within the RFID network 906 can be based on at least one of the following: device physical location, device functionality, device security level, process device association, make and/or model of device, type of device, device frequency, etc. Furthermore, it is to be appreciated that the binding engine 902 and the RFID process 904 can be substantially similar to previously described figures.

The RFID network 906 can include a plurality of universes (e.g., sub-systems, RFID networks), wherein a universe is a server of RFID entities. For simplicity, the RFID network 906 illustrates a single universe containing two collections of devices (e.g., device collections), where a first collection 908 is shown. It is to be appreciated that the device collections can correspond to device groups, wherein such collections and/or groups can be based on at least one of the following: device physical location, device functionality, device security level, process device association, make and/or model of device, type of device, device frequency, etc. For instance, an RFID sub-system can be a location wherein the entities involved are related to a substantially similar process. In one example, a sub-system can be a warehouse containing a plurality of receiving and/or shipping dock doors with associated devices. Thus, first collection 908 can be a collection of devices within the specified sub-system. It is to be appreciated a plurality of collection of devices can be implemented. Within a collection of devices, a device 910 can receive an RFID signal 916 from a pallet of goods 914 containing at least one RFID tag 912. It is to be appreciated the pallets and/or goods can be tagged based at least upon user specifications (e.g., single pallets tagged, individual goods tagged, pallets and goods tagged, etc.).

Figure 10:
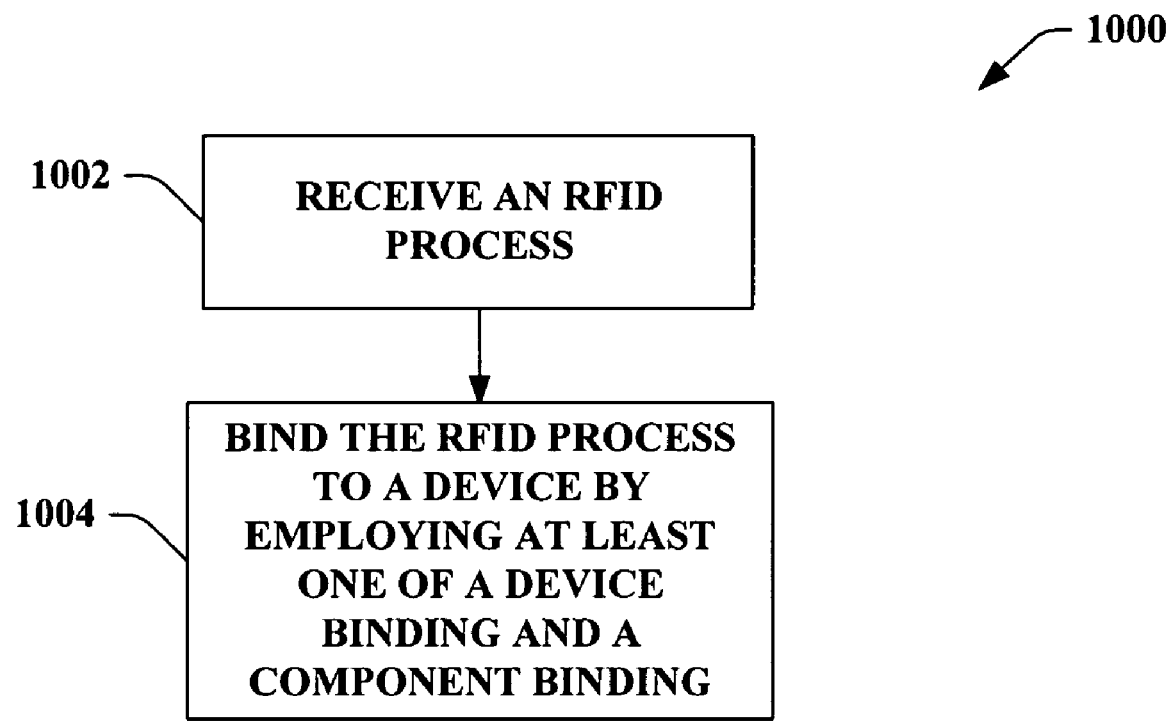
FIG. 10 illustrates an exemplary methodology that facilitates employing a binding between a process and one or more devices.
Figure 11:
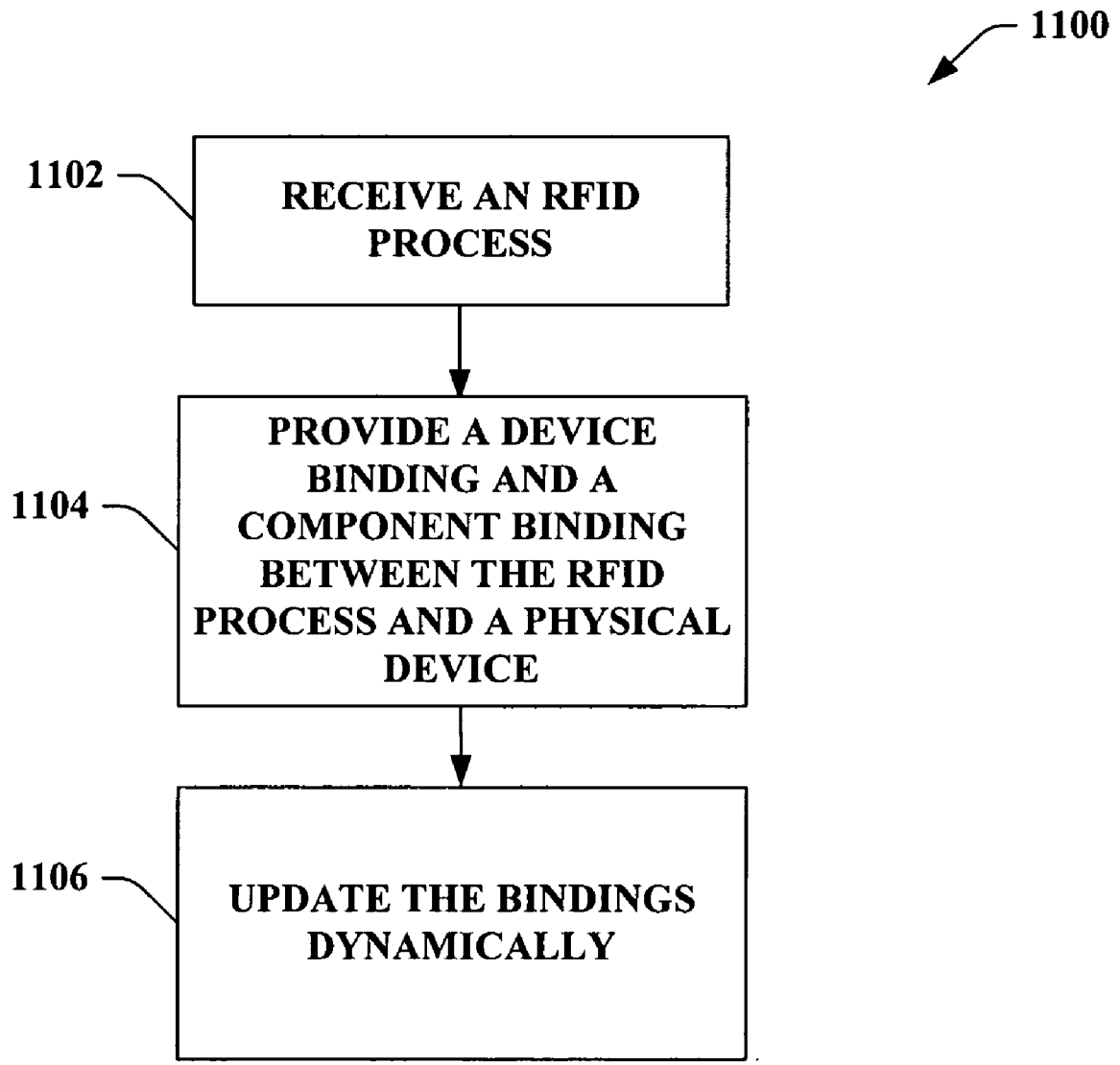
FIG. 11 illustrates an exemplary methodology for binding a process and at least one device such that dynamic updates can be invoked.
Figure 12:
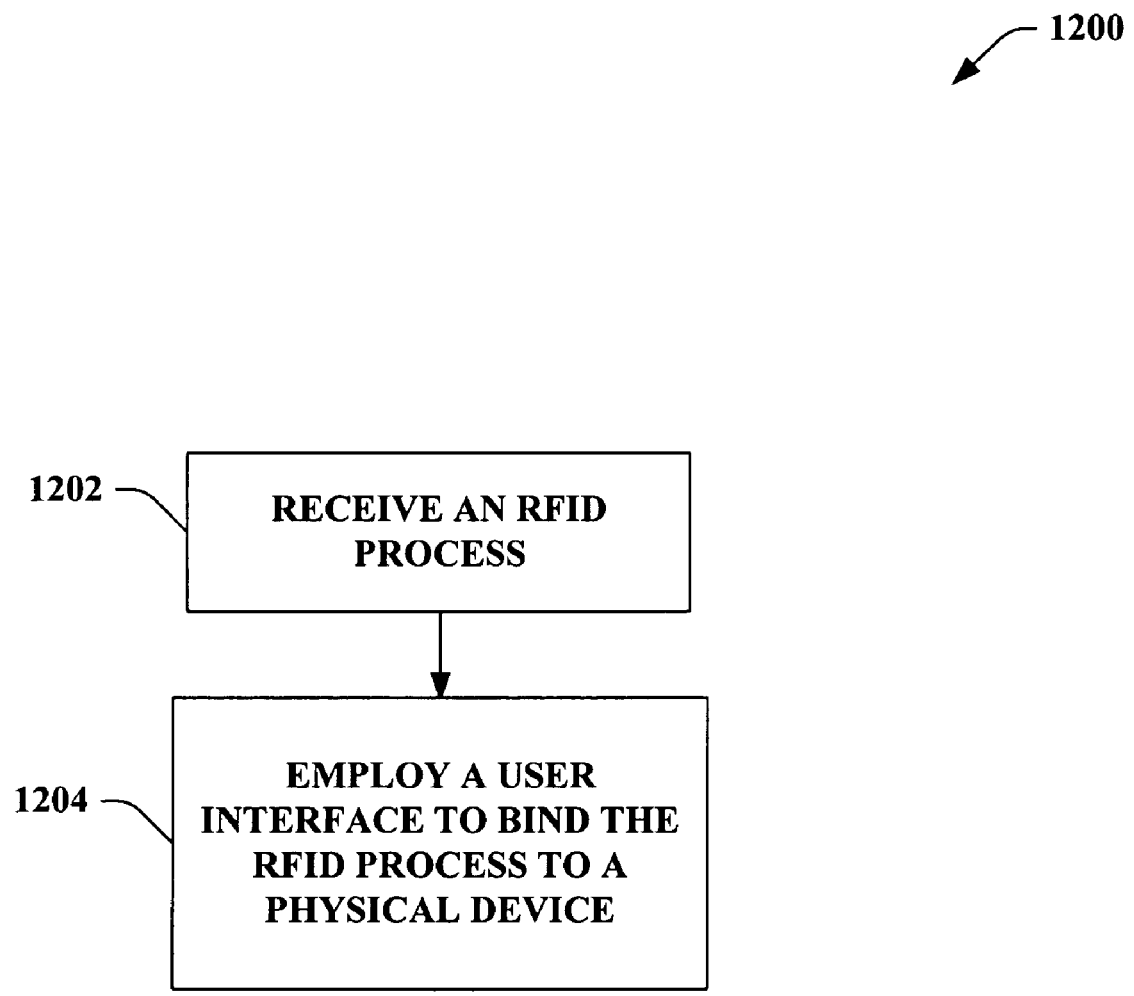
FIG. 12 illustrates an exemplary methodology that facilitates associating at least one process to at least one device employing a user interface.

FIGS. 10-12 illustrate methodologies in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 10 illustrates a methodology 1000 that facilitates employing a binding between a process and one or more devices. At reference numeral 1002, an RFID process can be received. The RFID process can be received by, for instance, an installation, a creation, and/or any combination thereof. The RFID process can be related to a particular RFID sub-system (e.g., an RFID server, RFID network, etc.) that is an uber or high-level object that forms together various entities to create a meaningful unit of execution. The RFID process can be and/or can include an outbound process (e.g., pick, pack, shipping scenario, etc.), a manufacturing process, a shipping process, a receiving process, tracking, data representation, data manipulation, data application, security, . . . . Additionally, the RFID process can include and/or respond to a device service, a tag read, an event, a tag write, a device configuration, a geographic tracking, a number count, etc. It is to be appreciated that the RFID process can have raw data collected via at least one device, wherein such raw data can be manipulated based at least in part upon a rule and/or a business rule engine (not shown). The RFID process can take a tag read event from a device and make the tag read event available for at least one high level application.

For instance, the RFID process can be a shipping process that represents multiple devices at various dock doors working together to perform tag reads, filtering, read enrichment, alert evaluation, and data storage in a sink for a host application to retrieve/process. In another example, the process can execute a manufacturing process, wherein devices are configured to read as well as write dependent upon a location. Moreover, additional functions such as filtering, alerting, enriching, etc. can be implemented at the location. In yet another example, the RFID process can write to a tag process, wherein a tag can be written in real-time based at least upon an input. The write process can also check if the write succeeded by reading and passing data back to the host.

At reference numeral 1004, the RFID process can be bound to a device by employing at least one of a device binding and a component binding. It is to be appreciated that the device can be within the RFID network and can be, but is not limited to being, an RFID reader, an RFID writer, an RFID printer, a printer, a reader, a writer, an RFID transmitter, an antenna, a sensor, a real-time device, an RFID receiver, a real-time sensor, a device extensible to a web service, and a real-time event generation system. Specifically, the binding can provide any suitable mapping from a physical device (e.g., device) to the RFID process. Moreover, the binding can be a process of mapping external devices to internal logical devices, and assigning values to initialization parameters of components. The device binding can be the action of linking a logical entity (e.g., logical device) with a physical entity. In device binding, a logical device is bound to a device or a device group, wherein the device group can be a collection of devices that have substantially similar characteristics or perform similar functions and are grouped to deal with devices efficiently. The component binding can provide any suitable mapping from an event handler to the RFID process. For instance, the component binding can be the specification of values for initialization parameters of components such as, but not limited to, internal logical elements such as an event handler, wherein the event handler can be managed code running in the context of the RFID process that processes a tag event.

FIG. 11 illustrates a methodology 1100 for binding a process and one or more devices such that dynamic updates can be invoked. At reference numeral 1102, an RFID process can be received. For instance, the RFID process can be purchased, installed, created, programmed, etc. in relation to a particular environment. In general, the RFID process can be related to a particular RFID sub-system (e.g., an RFID server, RFID network, etc.) that is an uber or high-level object that forms together various entities to create a meaningful unit of execution. In one example, the RFID process can be a business process, wherein devices can be indirectly utilized in association with the business process. In an example, the RFID stack can bridge the gap between devices and business applications. The business process can be, for instance, a business application to achieve a critical business function. For instance, the business application can be a back end application, an existing business application, a line of business (LOB) application, an accounting application, a supply chain management application, a resource planning application, and/or a business monitoring (BAM) application. In addition, the critical business function can be, for example, a demand plan, a forecast, and/or an inventory control with the incorporation of RFID data in real-time.

In another example, an RFID host can utilize a business rules engine (not shown), wherein such business rules engine can provide a rule-based system in association with any application such that a filter and/or alert can be utilized as a rule(s). The business rules engine can execute declarative filters and/or alerts as rules, wherein the rules can include a rule set adhered to an event, condition, and action format utilizing an extensible markup language (XML). The rule is at least one of the following: contained within a rule set that adheres to an event, a condition, and an action; and represented utilizing an extensible markup language (XML). Moreover, the condition has at least one of a set of predicates and a logical connective to form a logical expression that evaluates to one of a true and a false.

At reference numeral 1104, a device binding and a component binding between the RFID process and a physical device can be created and/or initiated. Moreover, the binding can be a process of mapping external devices to internal logical devices, and assigning values to initialization parameters of components. The device binding can be the action of linking a logical entity (e.g., logical device) with a physical entity. In device binding, a logical device is bound to a device or a device group, wherein the device group can be a collection of devices that have substantially similar characteristics or perform similar functions and are grouped to deal with devices efficiently. The component binding can provide any suitable mapping from an event handler to the RFID process. At reference numeral 1106, the bindings related to the RFID process can be updated dynamically. In other words, any changes and/or manipulations associated with the RFID process and the physical device bond (e.g., device binding and/or component binding), such changes and/or manipulations can be updated dynamically without interrupting the RFID process.

FIG. 12 illustrates a methodology 1200 that facilitates associating at least one process to at least one device employing a user interface. At reference numeral 1202, an RFID process can be received. At reference numeral 1204, a user interface can be employed to bind an RFID process to a physical device. For instance, the user interface can be a wizard application that can provide a step-by-step installation and/or setup for a device binding and/or a component binding of the RFID process and the physical RFID device. Such wizard can utilize various screens that can initiate a sequential implementation of the binding between the RFID process and the physical device. For instance, a user interface can display a list of logical devices in the RFID process. If there are no logical devices defined, the administrator can create one. For each logical device, the binding process can be repeated. In another example, the user interface can depicts the hierarchy of a device group and/or a device. The user interface can differentiate a hard link and a soft link utilizing, for example, an icon. In yet another example, the user interface that can employ a component binding, wherein the properties of the sink are displayed for the user to configure.

Figure 13:
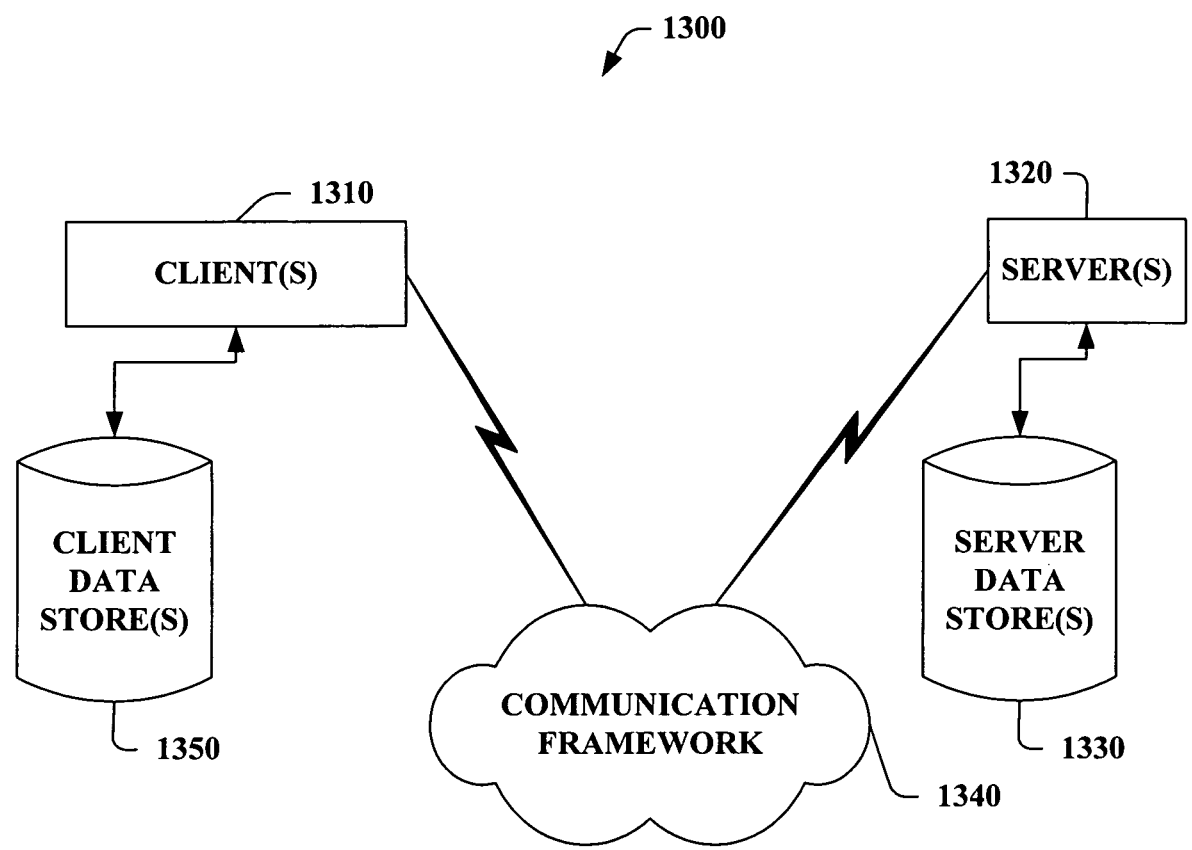
FIG. 13 illustrates an exemplary networking environment, wherein the novel aspects of the claimed subject matter can be employed.
Figure 14:
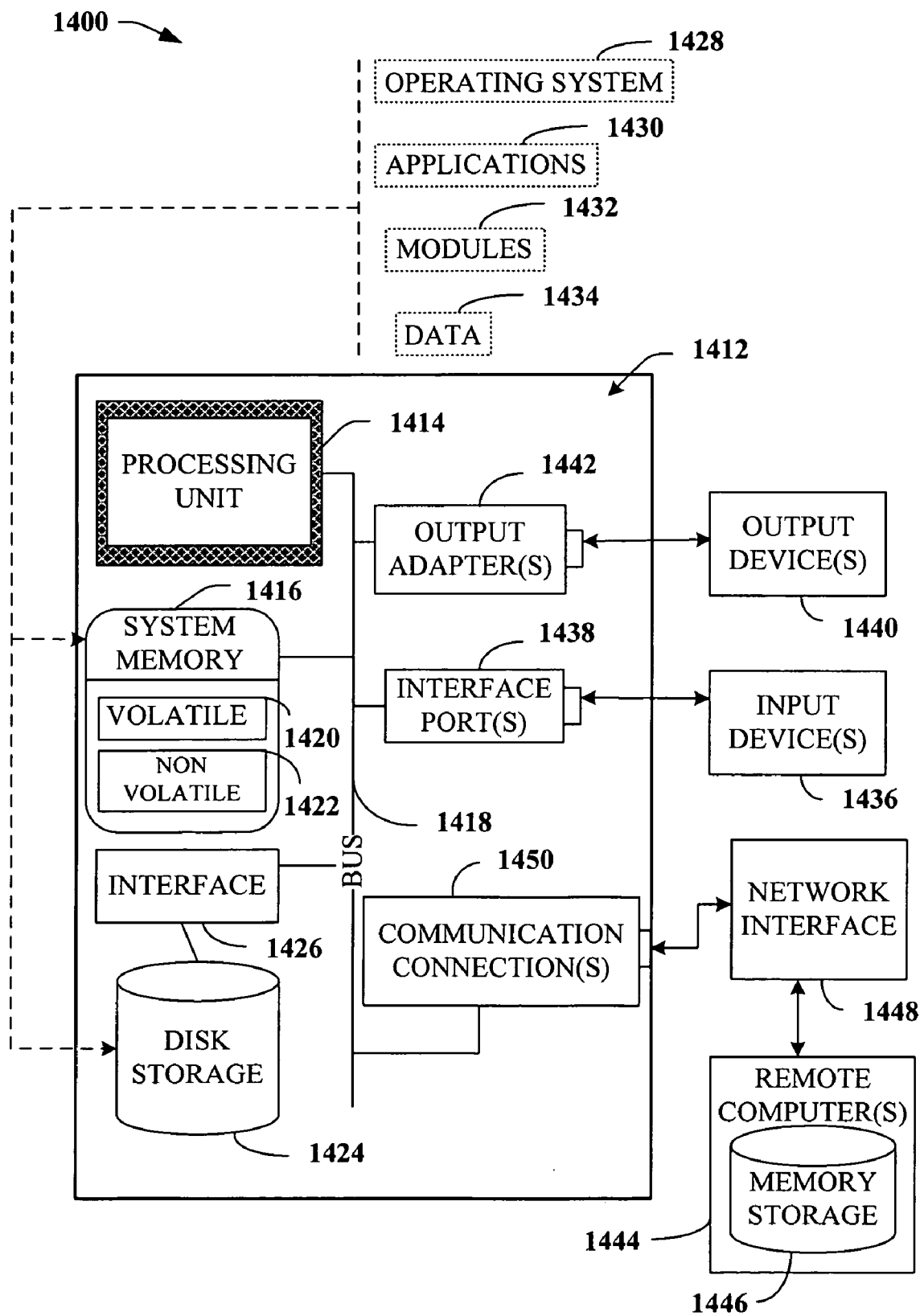
FIG. 14 illustrates an exemplary operating environment that can be employed in accordance with the claimed subject matter.

In order to provide additional context for implementing various aspects of the claimed subject matter, FIGS. 13-14 and the following discussion is intended to provide a brief, general description of a suitable computing environment in which the various aspects of the subject innovation may be implemented. For example, a binding engine that provides binding between a process and a device, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 13 is a schematic block diagram of a sample-computing environment 1300 with which the claimed subject matter can interact. The system 1300 includes one or more client(s) 1310. The client(s) 1310 can be hardware and/or software (e.g., threads, processes, computing devices). The system 1300 also includes one or more server(s) 1320. The server(s) 1320 can be hardware and/or software (e.g., threads, processes, computing devices). The servers 1320 can house threads to perform transformations by employing the subject innovation, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1320.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A computer-implemented system configured to facilitate binding at least one device, the computer-implemented system comprising:
    a radio frequency identification (RFID) business process configured to receive a tag read event from the at least one device and to make the tag read event available for at least one RFID application;
    a binding engine configured to bind the RFID business process to the at least one device and enable decoupling a design time activity and a deployment time activity associated with the RFID business process, the binding engine comprising:
        a device mapping component configured to employ a device binding; and
        a component configuration module configured to employ a component binding;
    a user interface configured to receive a user's selection of a logical device for the binding engine to bind to the at least one device and configure an event handler component bound by the binding engine to the at least one device; and
    a computer-readable storage medium comprising data structures and code that when executed by at least one processor, causes the at least one processor to perform the RFID business process and the binding engine in a computer.

2. The computer-implemented system of claim 1, wherein the device comprises at least one of the following: an RFID reader; an RFID transmitter; or an RFID receiver.

3. The computer-implemented system of claim 1, wherein the RFID business process comprises an object configured to create a unit of execution that relates to at least one of the following: an outbound process; a receiving process; a tracking process; a data representation process; a data manipulation process; a security process; or a process utilizing one of an RFID device service, a device collection, a tag read, an event, an event queue, a tag write, a device configuration or a number count.

4. The computer-implemented system of claim 1, wherein the binding is a mapping of an external device to an internal logical device and an assignment of at least one value to an initialization parameter of a component.

5. The computer-implemented system of claim 1, wherein the binding is an action of linking a logical entity with at least one physical entity.

6. The computer-implemented system of claim 5, wherein the logical entity is a logical device and the physical entity is the at least one device.

7. The computer-implemented system of claim 6, wherein the logical device is bound to a device group.

8. The computer-implemented system of claim 1, wherein the component binding is a specification of at least one value for an initialization parameter of a component.

9. The computer-implemented system of claim 8, wherein the component is at least one of an internal logical element or an event handler component.

10. The computer-implemented system of claim 9, wherein the event handler component comprises managed code in context of the RFID business process.

11. The computer-implemented system of claim 1, wherein the binding is configured to take a process definition and associate the at least one device and a component to a topology and system configuration within an enterprise.

12. The computer-implemented system of claim 1, further comprising a binding component configured to create a binding object.

13. The computer-implemented system of claim 1, further comprising a process update component configured to dynamically update the RFID business process in relation to at least one of a manipulation, a change or a disparity associated with the binding.

14. The computer-implemented system of claim 1, further comprising:
    a security component configured to recognize process administrator privilege and device administrator privilege; and
    a link component configured to maintain a binding relationship between the RFID business process and the device by employing a hard link, wherein the hard link cannot be modified via the user interface by a user having the device administrator privilege or by a user having the process administrator privilege.

15. The computer-implemented system of claim 8, further comprising the at least one device within an RFID network that comprises a collection of devices that form a sub-system, wherein the sub-system comprises:
    an RFID reader configured to receive an RFID signal; and
    an RFID tag configured to transmit to at least one of the collection of devices.

16. The computer-implemented system of claim 1, further comprising a presentation component configured to provide at least one user interface to facilitate interaction between a user and the binding engine.

17. A computerized method, comprising:
    storing on a computer-readable storage medium, a plurality of business processes that utilize automatic data capture through radio frequency identification (ADC-RFID processes);
    displaying a user interface on a computer system, the user interface presenting information indicative of a plurality of logical devices and the plurality of ADC-RFID processes;
    receiving, via the user interface, one or more selections from a user of at least one of the plurality of logical devices and at least one of the plurality of ADC-RFID processes; and
    binding the selected ADC-RFID business process to a radio frequency identification (RFID) device by employing a device binding between the selected logical device and a physical device, and by performing a component binding between the selected ADC-RFID process and the physical device.

18. The computerized method of claim 17, further comprising updating the device binding and the component binding dynamically.

19. A computer-readable storage medium storing computer-executable instructions for performing the following acts:

receiving a tag read event from a device and making the tag read event available for at least one application employing a business process that utilizes radio frequency identification (RFID) technology;

binding to the device, the business process, wherein the business process utilizes RFID technology, and wherein binding the device to the business process decouples a design time activity and a deployment activity associated with the business process utilizing RFID technology;

performing a component binding; and selecting a logical device for binding to the device and for configuring an event handler component bound to the device.

20. A computerized method comprising:

designing a radio frequency identification (RFID)-based business process comprised of one or more logical device elements, one or more logical sources as containers for one or more logical device elements or a pipeline of components, wherein the pipeline of components comprises one or more event handler components;

deploying, to a physical RFID device architecture, the RFID-based business process in a computer-executable form, by mapping logical entities to physical RFID devices and by configuring event handler components by specifying values for initialization parameters, wherein the physical RFID device architecture comprises a selectable combination of one or more types and one or more quantities of the physical RFID devices;

outputting, to a user interface of a computer system, a list of logical devices;

receiving via the user interface a user's selection from the list for device binding and component binding;

executing the RFID-based business process by receiving a tag read event at the mapped physical RFID device and performing a response in accordance with a bound event handler component; and storing one or more data structures and storing one or more codes in a computer-readable storage medium for enabling the computer system to perform the device binding and the component binding.

21. The computer-implemented system of claim 1, wherein the RFID business process comprises an object configured to create a unit of execution that relates to a manufacturing process or a shipping process.

* * * * *